United States Patent
Fujimori et al.

(10) Patent No.: US 7,332,564 B2
(45) Date of Patent: Feb. 19, 2008

(54) POLYMERIZATION CATALYST FOR POLYESTER, METHOD FOR PRODUCING IT AND PROCESS FOR PRODUCING POLYESTER USING IT

(75) Inventors: Yoshihiro Fujimori, Yokkaichi (JP); Yutaka Yatsugi, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/219,765

(22) Filed: Sep. 7, 2005

(65) Prior Publication Data

US 2006/0009612 A1 Jan. 12, 2006

Related U.S. Application Data (63) Continuation of application No. PCT/JP2004/002704, filed on Mar. 4, 2004.

(30) Foreign Application Priority Data

Mar. 7, 2003 (JP) ............................. 2003-061248

(51) Int. Cl.
*C08G 79/02* (2006.01)

(52) U.S. Cl. ................. 528/400; 210/500.12; 210/640; 528/378

(58) Field of Classification Search ................ 528/274, 528/279, 280, 281, 282, 283, 378, 400; 524/765, 524/767, 773, 777, 783, 785, 786, 787, 794; 502/102, 104, 107, 111, 115, 117, 132, 133, 502/150; 210/500.21, 640

See application file for complete search history.

(56) References Cited

U.S. PATENT DOCUMENTS

| | | | | |
|---|---|---|---|---|
| 6,500,915 B1 * | 12/2002 | Fujimori et al. | ............ | 528/279 |
| 6,649,731 B2 * | 11/2003 | Hori et al. | ................... | 528/279 |
| 6,667,383 B2 * | 12/2003 | Fujimori et al. | ............ | 528/279 |
| 2002/0137879 A1 * | 9/2002 | Ohmatsuzawa et al. | .... | 528/279 |
| 2006/0009612 A1 | 1/2006 | Fujimori et al. | | |

FOREIGN PATENT DOCUMENTS

| | | |
|---|---|---|
| DE | 101 27 146 A1 | 12/2002 |
| EP | 1 270 640 A1 | 1/2003 |
| EP | 1 273 610 A1 | 1/2003 |
| JP | 7-207010 | 8/1995 |
| JP | 2001-72751 | 3/2001 |
| WO | WO 99/45056 | 9/1999 |
| WO | WO 01/56694 A1 | 8/2001 |
| WO | WO 03/09028 A | 11/2003 |

OTHER PUBLICATIONS

U.S. Appl. No. 11/294,368, filed Dec. 6, 2005, Fujimori, et al.
U.S. Appl. No. 11/449,645, Jun. 9, 2006, Fujimori, et al.

* cited by examiner

*Primary Examiner*—Terressa Boykin
(74) *Attorney, Agent, or Firm*—Oblon, Spivak, McClelland, Maier & Neustadt, P.C.

(57) ABSTRACT

Polymerization catalysts for polyesters include: (1) metal elements selected from metal elements of Group 4A of the Periodic Table; and (2) metal elements selected from metal elements of Group 2A of the Periodic Table, aluminum, manganese, iron, cobalt, zinc, gallium and germanium. The catalysts are in a liquid state with a turbidity of at most 20% in a light path length of 10 mm, and a ratio the total amount of metal atoms derived from the above metal element (2) to the total amount of metal atoms derived from the above metal element (1) is from 0.50 to 3.50.

15 Claims, 1 Drawing Sheet

POLYMERIZATION CATALYST FOR POLYESTER, METHOD FOR PRODUCING IT AND PROCESS FOR PRODUCING POLYESTER USING IT

TECHNICAL FIELD

The present invention relates to a polymerization catalyst for a polyester, a method for producing it and a process for producing a polyester using it. Particularly, it relates to a polymerization catalyst for a polyester, with which a polyester having various physical properties such as color tone suitable for various applications to e.g. containers such as bottles, films, sheets and fibers can be produced at high reaction rate, a method for producing it and a process for producing a polyester using it.

BACKGROUND ART

Heretofore, a polyester has been widely used for various applications to e.g. containers such as bottles, films, sheets and fibers, since it is excellent in chemical and physical properties. Such a polyester is usually produced via an esterification reaction or an ester exchange reaction and a melt polycondensation reaction and as the case requires, particularly for containers, further by a solid phase polycondensation reaction, and for the polycondensation reaction, a compound such as antimony, germanium or titanium is used as a catalyst.

However, a polyester produced by employing an antimony compound as a catalyst has characteristic dull color and has drawbacks in the safety and sanitation and in the environment due to toxicity pointed out regarding the antimony compound. Accordingly, it has been strongly required to reduce the amount of the antimony compound used or to develop a polycondensation catalyst which takes the place of the antimony compound. Further, although a polyester produced by employing a germanium compound as a catalyst is preferred in view of e.g. transparency and safety and sanitation, the germanium compound itself is very expensive and economical disadvantage is inevitable. Therefore, it has also been strongly desired to reduce the amount of the germanium compound used or to develop a polycondensation catalyst which takes the place of it. Under these circumstances, a titanium compound has attracted attention which is available at a low cost and is free from problems in view of e.g. safety and sanitation, and has been used practically instead of the antimony compound or the germanium compound. However, a polyester produced by employing a titanium compound as a catalyst has such drawbacks that it is characteristically yellowish, and is poor in the thermal stability.

To solve such drawbacks caused by a titanium compound, many proposals have been made to use a titanium compound, an alkali metal or alkaline earth metal compound and a phosphorus compound in a specific ratio, thereby to improve e.g. the color tone of a polyester to be obtained (for example, JP-A-2002-179781). However, such a catalyst system is poor in catalytic activity, and thus the polycondensation requires a long time or a relatively large amount of a titanium compound is required, whereby the color tone deteriorates and as a result, the color tone can be by no means improved.

Further, many proposals have been made regarding use of a composite compound comprising a titanium compound and another metal compound or the like. For example, it is proposed that by use of a solid titanium-containing compound obtained by hydrolyzing a mixture comprising a titanium alkoxide compound or a titanium halide with a compound such as magnesium, the catalytic activity of the titanium compound will improve and in addition, the transparency and the color tone of a polyester to be obtained will improve (JP-A-2001-55434, JP-A-2001-64377).

Further, it has been known that a high catalytic activity will be obtained by use of a co-precipitate obtained by simultaneous hydrolysis of an alkylate, alcoholate or carboxylate of titanium and an alkylate, alcoholate or carboxylate of an alkali metal, an alkaline earth metal or the like (JP-A-2002-503274). However, according to studies by the present inventors, it was found that the composite compound comprising a titanium compound and another metal compound or the like proposed in the publications is in a solid state, and is insoluble in an organic solvent of e.g. a diol component as a raw material for the polyester, and when it is used in the form of a slurry having it dispersed in such an organic solvent (the slurry had a turbidity exceeding 20% in a light path length of 10 mm), the polycondensation reaction rate tends to be insufficient and further, there is a problem in e.g. handling efficiency. Further, it was found that various physical properties such as color tone and transparency of a polyester to be obtained should be further improved.

DISCLOSURE OF THE INVENTION

Under these circumstances, it is an object of the present invention to solve the above problems in production of a polyester employing e.g. a titanium compound as a polycondensation catalyst. Namely, it is an object of the present invention to provide a polymerization catalyst for a polyester, with which a polyester excellent in color tone, transparency, etc. can be produced at a high reaction rate, a method for producing it and a process for producing a polyester using it.

The present invention provides a polymerization catalyst for a polyester, characterized in that it comprises components having at least the following metal element (1) and the following metal element (2), their contents satisfy the following (a), and it is in a liquid state with a turbidity of at most 20% in a light path length of 10 mm:

1) at least one metal element selected from the group consisting of metal elements of Group 4B of the Periodic Table,
2) at least one metal element selected from the group consisting of metal elements of Group 2A of the Periodic Table, aluminum, manganese, iron, cobalt, zinc, gallium and germanium,
(a) when the total amount of metal atoms derived from the above metal element (1) is represented by t (mol/catalyst kg), and the total amount of metal atoms derived from the above metal element (2) is represented by m (mol/catalyst kg), the value of m/t is within the following range:

$0.50 \leq m/t \leq 3.50$

The present invention further provides a method for producing the above polymerization catalyst for a polyester, characterized by stirring a compound of the following metal element (1), a compound of the following metal element (2), the following (3) and the following (4) at a temperature of from 0 to 200° C. for at least 5 minutes:

1) at least one metal element selected from the group consisting of metal elements of Group 4B of the Periodic Table, (2) at least one metal element selected from the group consisting of metal elements of Group 2A of the Periodic Table, aluminum, manganese, iron, cobalt, zinc, gallium and germanium, (3) an organic solvent and/or water, and (4) at least one acid selected from the group consisting of organic acids and inorganic acids.

The present invention further provides a process for producing a polyester via an esterification reaction and a polycondensation reaction of a dicarboxylic acid component containing terephthalic acid as the main component and a diol component containing ethylene glycol as the main component, characterized in that the polycondensation reaction is carried out in the presence of the above polymerization catalyst for a polyester.

BRIEF EXPLANATION OF THE DRAWINGS

FIG. 1 (*a*) and FIG. 1 (*b*) are a plan view and a front view, respectively, illustrating a stepped molded plate for evaluation of the physical properties, molded in Examples.

BEST MODE FOR CARRYING OUT THE INVENTION

The following explanation regarding constituents is a typical example of the embodiment of the present invention, and the present invention is by no means restricted to such specific explanation.

The polymerization catalyst for a polyester of the present invention comprises components having at least the following metal element (1) and the following metal element (2), with contents which satisfy the following (a), and is in a liquid state:

1) at least one metal element selected from the group consisting of metal elements of Group 4B of the Periodic Table, (2) at least one metal element selected from the group consisting of metal elements of Group 2A of the Periodic Table, aluminum, manganese, iron, cobalt, zinc, gallium and germanium, (a) when the total amount of metal atoms derived from the above metal element (1) is represented by t (mol/catalyst kg), and the total amount of metal atoms derived from the above metal element (2) is represented by m (mol/catalyst kg), the value of m/t is within the following range:

$$0.50 \leq m/t \leq 3.50$$

The metal element of Group 4B of the Periodic Table of the metal element (1) may, for example, be titanium, zirconium or hafnium, and among them, titanium is preferred. Further, the metal element of Group 2A of the Periodic Table of the above metal element (2) may, for example, be beryllium, magnesium, calcium, strontium or barium, and among metal elements including aluminum, manganese, iron, cobalt, zinc, gallium and germanium, preferred is the metal element of Group 2A of the Periodic Table, iron or zinc, more preferred is the metal element of Group 2A of The periodic Table, particularly preferred is magnesium or calcium, and among them, magnesium is preferred.

It is essential that the polymerization catalyst for a polyester in a liquid state of the present invention is substantially homogenous and transparent, and has a turbidity of at most 20% in a light path length of 10 mm, and it preferably has a turbidity of at most 10%. If this turbidity exceeds the above range, for example, in a case of e.g. a slurry having a solid catalyst dispersed in an organic solvent, the polycondensation reaction rate tends to be insufficient, and a polyester to be obtained tends to be poor in color tone and transparency. The reason is not necessarily clear but is considered to be because the polymerization catalyst for a polyester of the present invention is substantially homogeneous and transparent and is a catalyst in a liquid state in which active sites are highly dispersed, whereas in e.g. a slurry of a solid catalyst, catalyst active sites are localized on the surface of the solid catalyst, whereas the number of active sites is small, the polycondensation velocity tends to be low, and deterioration of color tone due to a side reaction tends to be relatively remarkable. Otherwise, it is considered to be one of reasons that a solid substance such as the solid catalyst functions as a nucleating agent of a polyester to be obtained and decreases transparency.

Further, a polymerization catalyst having a turbidity exceeding the above range, such as a polymerization catalyst in the form of a slurry having a solid catalyst dispersed in an organic solvent, is poor in handling efficiency such that it is difficult to add a required very small amount of the catalyst with accuracy as compared with addition of a liquid catalyst, or the slurry sediments in a catalyst storage tank or in an addition line, which leads to scaling.

Here, the turbidity is determined by putting a liquid catalyst in a cell having a light path length of 10 mm and measuring the turbidity by means of a haze meter at 23° C. under 50% RH using ethylene glycol as a control.

In the polymerization catalyst for a polyester of the present invention, in view of the polycondensation reaction rate and the color tone of a polyester to be obtained, when the total amount of metal atoms derived from the above metal element (1) is represented by t (mol/catalyst kg) and the total amount of metal atoms derived from the above metal element (2) is represented by m (mol/catalyst kg), the lower limit of the ratio of them (m/t) is usually 0.50, preferably 1.00, more preferably 1.50, and the upper limit is usually 3.50, preferably 2.90, more preferably 2.40. When m/t is within the above range, the polycondensation reaction rate and the color tone of a polyester to be obtained when the polymerization catalyst for a polyester of the present invention is used will be within preferred ranges.

The amounts of the respective metal elements in the components having the above metal element (1) and the above metal element (2) are preferably such that the total amount (t) of atoms derived from the above metal element (1) is $0 < t \leq 4$ (mol/catalyst kg) and the total amount (m) of atoms derived from the above metal element (2) is $0 < m \leq 7$ (mol/catalyst kg) per 1 kg of the polymerization catalyst for a polyester. Particularly when the metal element (1) is titanium and the metal element (2) is magnesium, it is preferred that $0 < t \leq 3$ (mol/catalyst kg) and $0 < m \leq 5$ (mol/catalyst kg). When m and t are within the above ranges, the turbidity of the polymerization catalyst for a polyester of the present invention will be stably within the preferred range as specified by the present invention, and as a result, the polycondensation reaction rate and the color tone of a polyester to be obtained will be stably within preferred ranges. Here, "the turbidity will be stably within the preferred range as specified by the present invention" means, for example, not only the turbidity will not increase at the time of preparation of the catalyst of the present invention but also the turbidity will not increase due to precipitation of catalytic components when the catalyst of the present invention is stored at a high temperature. Further, it means that precipitation and scaling will be inhibited when the catalyst of the present invention passes through a high temperature portion in an addition pipe when it is added to a polycondensation reaction system at a high temperature, and the polymerization catalyst is smoothly added with a low turbidity to the end. However, this is not particularly limited to such meanings.

Further, the polymerization catalyst for a polyester of the present invention has a pH of usually at most 7, preferably at most 6, more preferably at most 5, particularly preferably at most 4, furthermore preferably at most 3, and the pH is preferably lower, although it is not particularly limited so long as the above turbidity range is satisfied. When the polymerization catalyst for a polyester of the present invention has a pH within the above range, the turbidity will be stably within the preferred range as specified by the present invention, and as a result, the polycondensation reaction rate and the color tone or transparency of a polyester to be obtained will be stably within preferred ranges.

In order that the pH is within the above range, a method of adjusting the contents of the above metal element (1) and the above metal element (2), a method of incorporating the following component (3) and/or the following component (4) into the polymerization catalyst for a polyester as the case requires, may, for example, be mentioned:

(3) an organic solvent and/or water
(4) at least one acid selected from the group consisting of organic acids and inorganic acids The organic solvent for the component (3) is preferably an alcohol, more preferably an organic solvent having a high affinity with a reaction liquid for a polyester such as a diol as a raw material of a polyester. Such an organic solvent may, for example, be a monool or polyol having from about 1 to about 20 carbon atoms, specifically, a monool such as methanol, ethanol, propanol, butanol, pentanol, hexanol, heptanol, octanol or nonanol, or a diol or a polyol which is one component used for production of a polyester of the present invention as mentioned hereinafter, such as ethylene glycol, diethylene glycol, trimethylene glycol or tetramethylene glycol. Among them, a diol is preferred, and ethylene glycol is particularly preferred.

The component (3) in the present invention is preferably an organic solvent and water, particularly preferably a mixture of water and ethylene glycol which is the particularly preferred organic solvent.

In such a case, as a preferred amount of water, as represented by the weight concentration based on the entire polymerization catalyst for a polyester, the lower limit is usually 1%, preferably 2%, more preferably 3%, and the upper limit is usually 30%, preferably 20%, more preferably 10%.

When the organic solvent and water are used as the component (3) and water is used in the above preferred amount, the turbidity of the polymerization catalyst for a polyester of the present invention will be stably within the preferred range as specified by the present invention, and as a result, the polycondensation reaction rate and the color tone or the transparency of a polyester to be obtained will be stably within preferred ranges.

Further, specifically, the organic acid of the component (4) may, for example, be an aliphatic saturated monocarboxylic acid such as acetic acid, propionic acid, butyric acid, hexoic acid, stearic acid or behenic acid, an aliphatic saturated dicarboxylic acid and an anhydride thereof, such as oxalic acid, malonic acid, succinic acid, glutaric acid, adipic acid, pimelic acid, suberic acid, azelic acid, sebacic acid, undecadicarboxylic acid or dodecadicarboxylic acid, an aliphatic unsaturated dicarboxylic acid and an anhydride thereof, such as maleic acid or fumaric acid, an aliphatic polyhydric carboxylic acid and an anhydride thereof, such as tricarballylic acid, an alicyclic dicarboxylic acid and an anhydride thereof, such as hexahydrophthalic acid or hexahydroisophthalic acid, an aromatic monocarboxylic acid such as benzoic acid or t-butylbenzoic acid, an aromatic dicarboxylic acid and an anhydride thereof, such as phthalic acid, isophthalic acid, dibromoisophthalic acid, sodium sulfoisophthalate, terephthalic acid, phenylenedioxy dicarboxylic acid, 4,4'-diphenyl dicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid or 2,6-naphthalene dicarboxylic acid, an aromatic polyhydric carboxylic acid and an anhydride thereof, such as trimellitic acid, trimesic acid or pyromellitic acid, or a hydroxycarboxylic acid or an alkoxycarboxylic acid such as glycolic acid, lactic acid, citric acid, gallic acid, p-hydroxybenzoic acid or p-β-hydroxyethoxybenzoic acid. Further, the inorganic acid may, for example, be specifically hydrochloric acid, sulfuric acid or nitric acid. Among them, an organic acid is preferred, an aliphatic carboxylic acid such as an aliphatic saturated monocarboxylic acid such as acetic acid, an aliphatic saturated dicarboxylic acid and an anhydride thereof, such as succinic acid, or an aliphatic saturated hydroxycarboxylic acid such as lactic acid is more preferred, an aliphatic saturated hydroxycarboxylic acid is particularly preferred, and among them, lactic acid is preferred.

The polymerization catalyst for a polyester of the present invention is in a liquid state comprising components having at least the above metal element (1) and the above metal element (2), and it is in a liquid state either by the compound of the above metal element (1) and/or the above metal element (2) being a liquid compound or by the compounds of the above metal element (1) and the above metal element (2) being reacted with or dissolved in the organic solvent and/or water of the above component (3) or the acid of the above component (4). However, the polymerization catalyst for a polyester of the present invention is preferably in the latter state.

When an organic acid is used as the above component (4), the organic acid may be used as the organic solvent for the above component (3).

Further, the content of the acid of the above component (4) is preferably at most 50 wt % based on the entire polymerization catalyst for a polyester.

Further, as the proportion (A) (mol/catalyst kg) of the acid of the component (4) in the catalyst of the present invention to the total amount (m) (mol/catalyst kg) of atoms derived from the metal element of the component (2), as the ratio of them (A/m), the lower limit is usually 1.6, preferably 2.0, more preferably 2.5, and the upper limit is usually 15, preferably 8.0, more preferably 5.0, furthermore preferably 4.0. When A/m is within the above range, the turbidity and the pH of the polymerization catalyst for a polyester of the present invention will be stably within the preferred ranges as specified by the present invention, and as a result, the polycondensation reaction rate and the color tone or the transparency of a polyester to be obtained will be stably within preferred ranges.

The polymerization catalyst for a polyester of the present invention is produced usually by stirring and mixing a compound of the above metal element (1) and a compound of the above metal element (2), preferably these compounds and an organic solvent and/or water of the above component (3) and an acid of the above component (4) by using a preparation tank equipped with a stirrer.

The compound of a metal element of Group 4A of the Periodic Table of the above (1) and the compound of a metal element of Group 2A of the Periodic Table, aluminum, manganese, iron, cobalt, zinc, gallium and germanium of the above (2), may, for example, be an oxide, hydroxide, alkoxide, aliphatic acid salt, oxalate, citrate, carbonate, halide or complex compound of such metal elements. Among them, a solid compound insoluble in water or an organic solvent is inappropriate.

As one example of a preferred compound, specifically, the compound of a metal element of Group 4A of the Periodic Table of the above (1) may, for example, be tetra-n-propyl titanate, tetra-1-propyl titanate, tetra-n-butyl titanate, tetra-n-butyl titanate tetramer, tetra-t-butyl titanate, acetyl-tri-1-propyl titanate, titanium acetate, titanium oxalate or titanium chloride, and among them, a titanium alkoxide such as tetra-n-propyl titanate, tetra-i-propyl titanate, tetra-n-butyl titanate, tetra-n-butyl titanate tetramer, tetra-t-butyl titanate or acetyl-tri-i-propyl titanate or titanium oxalate is preferred, and a titanium alkoxide is particularly preferred.

Further, the compound of a metal element of Group 2A of the Periodic Table, aluminum, manganese, iron, cobalt, zinc, gallium and germanium of the above (2) may, for example, be magnesium oxide, magnesium hydroxide, magnesium alkoxide, magnesium acetate, magnesium carbonate, calcium oxide, calcium hydroxide, calcium acetate, calcium carbonate, aluminum ethoxide, aluminum isopropoxide, aluminum butoxide, aluminum acetylacetonate, aluminum acetate, aluminum chloride, manganese dioxide, manganese hydroxide, manganese acetate, iron acetylacetonate, iron acetate, iron oxalate, iron citrate, tricarbonyl (butadienyl) iron, cobalt acetate, cobalt chloride, zinc hydroxide, zinc acetylacetonate, zinc acetate, zinc oxalate, germanium oxide, germanium ethylene glycoxide or germanium chloride. Among them, a compound of a metal element of Group 2A of the Periodic Table, aluminum, iron or zinc is preferred, a compound of a metal element of Group 2A of the Periodic Table is more preferred, magnesium acetate or calcium acetate is particularly preferred, and among them, magnesium acetate is preferred.

The polymerization catalyst for a polyester of the present invention is produced by stirring and mixing the compound of the above metal element (1) and the compound of the above metal element (2), preferably, these compounds and the organic solvent and/or water of the above component (3) and/or the acid of the above component (4). The lower limit of the temperature at the time of mixing is usually 0° C., preferably 30° C., and the upper limit is usually 200° C., preferably 150° C. The mixing time is usually at least 5 minutes, preferably from 10 to 90 minutes. The pressure at the time of mixing is not particularly limited so long as the organic solvent and/or water of the above component (3) is kept in a liquid phase.

The ratio of the compound of the above metal element (1) and the compound of the above metal element (2), and the organic solvent and/or water of the above component (3) and the acid of the above component (4) is essentially such that the total amount (t) of atoms derived from the above metal element (1), the total amount (m) of atoms derived from the above metal element (2) and the proportion (m/t) of them, as explained above for the polymerization catalyst for a polyester are satisfied, preferably such that the amount of water of the above component (3) is satisfied, and preferably such that the content of the acid of the above component (4), and the ratio (A/m) of the proportion (A) of the acid of the above component (4) in the catalyst to the total amount (m) of atoms derived from the above metal element (2) are satisfied.

Further, the order of mixing is not particularly limited. For example, when the organic solvent and/or water of the above component (3) and the acid of the above component (4) are used, a method of preliminarily mixing the components (3) and (4) and then adding to the mixture the compound of the above metal element (1) and the compound of the above metal element (2) simultaneously or sequentially (either one is added first), followed by stirring and mixing, a method of adding (1) and (2) simultaneously or sequentially (either one is added first) to (3), followed by stirring and mixing, and then further adding (4) to the mixture, followed by stirring and mixing, or a method of adding (1) or (2) to (3), followed by stirring and mixing, then adding (4) to the mixture, followed by stirring and mixing, and then adding (2) or (1), followed by stirring and mixing, may, for example, be mentioned.

In every method, it is preferred to maintain the pH of the mixture as low as possible, preferably at most 7, more preferably at most 5, furthermore preferably at most 3.

For example, when an organic solvent and water is used as the component (3), preferred is a method of adding (2) and (4) to (3) simultaneously or sequentially (either one is added first), followed by stirring and mixing, and then adding (1) to the mixture, followed by stirring and mixing.

By employing such preferred range and method, the turbidity of the polymerization catalyst for a polyester of the present invention will be stably within the preferred range as specified by the present invention, and as a result, the polycondensation reaction rate and the color tone or transparency of a polyester to be obtained will be stably within preferred ranges.

The polymerization catalyst for a polyester of the present invention produced by the above production method may be a mere mixture of the compound of the above metal element (1) and the compound of the above metal element (2), may form a composite compound wherein they form a composite by some reaction, or may be in such a state that the compound of the above metal element (1), the compound of the above metal element (2) and a composite compound of them coexist, and in each case, it may form a composite compound further including the organic solvent and/or water of the above component (3) and/or the acid of the above component (4). In each case, it is essential that the turbidity satisfies the above range.

As the process for producing a polyester of the present invention, basically, a conventional process for producing a polyester resin can be employed except that the polymerization catalyst for a polyester of the present invention is used. One example of the conventional process for producing a polyester resin may be a process of subjecting a dicarboxylic acid component containing terephthalic acid or its ester forming derivative as the main component and a diol component containing ethylene glycol as the main component to an esterification reaction in an esterification reaction tank or to an ester exchange reaction in the presence of an ester exchange catalyst, transferring the obtained polyester low molecular weight product which is an esterification reaction product or an ester exchange reaction product to a polycondensation tank, and subjecting it to melt polycondensation in the presence of a polycondensation catalyst. This production process may be carried out continuously or by the batch and is not particularly limited.

As raw materials to be used for the process for producing a polyester of the present invention, the proportion of terephthalic acid or its ester forming derivative in the dicarboxylic acid component is preferably at least 90 mol %, more preferably at least 95 mol %, particularly preferably at least 99 mol %, and the proportion of ethylene glycol in the diol component is preferably at least 90 mol %, more preferably at least 95 mol %, particularly preferably at least 97 mol %. If the proportion of the terephthalic acid or its ester forming derivative in the dicarboxylic acid component or the proportion of ethylene glycol in the diol component is less than the above range, mechanical strength, gas barrier properties and heat resistance of a polyester to be obtained as a molded product tend to be low.

The ester forming derivative of terephthalic acid may, for example, be an ester having an alkyl group having from about 1 to about 4 carbon atoms, or a halide. Further, as a dicarboxylic acid component other than terephthalic acid or its ester forming derivative, for example, one or more of aromatic dicarboxylic acids such as phthalic acid, isophthalic acid, dibromoisophthalic acid, sodium sulfoisophthalate, phenylenedioxy dicarboxylic acid, 4,4'-diphenyl dicarboxylic acid, 4,4'-diphenyl ether dicarboxylic acid, 4,4'-diphenyl ketone dicarboxylic acid, 4,4-diphenoxyethane dicarboxylic acid, 4,4'-diphenylsulfone dicarboxylic acid and 2,6-naphthalene dicarboxylic acid, alicyclic dicarboxylic acids such as hexahydroterephthalic acid and hexahydroisophthalic acid, and an aliphatic dicarboxylic acid such as succinic acid, glutaric acid, adipic acid, pimelic acid, suberic acid, azelaic acid, sebacic acid, undecadicarboxylic acid and dodecadicarboxylic acid, and its alkyl ester having from about 1 to about 4 carbon atoms and its halide, may be used as a copolymerizable component.

Further, as a diol component other than ethylene glycol, diethylene glycol may, for example, be mentioned, and the proportion of diethylene glycol in the diol component is preferably at most 3.0 mol % including the content of a by-product in the reaction system, more preferably at least 1.5 mol % and at most 2.5 mol %. As another diol component, for example, one or more of aliphatic diols such as trimethylene glycol, tetramethylene glycol, pentamethylene glycol, hexamethylene glycol, octamethylene glycol, decamethylene glycol, neopentyl glycol, 2-ethyl-2-butyl-1,3-propane diol, polyethylene glycol and polytetramethylene ether glycol, alicyclic diols such as 1,2-cyclohexanediol, 1,4-cyclohexanediol, 1,1-cyclohexanedimethylol, 1,4-cyclohexanedimethylol and 2,5-norbornanedimethylol, aromatic diols such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone and bis(4-β-hydroxyethoxyphenyl)sulfonic acid, and an ethylene oxide addition product and a propylene oxide addition product of 2,2-bis(4'-hydroxyphenyl)propane, may be used as a copolymerizable component.

Further, as a copolymerizable component, one or more of hydroxycarboxylic acids and alkoxycarboxylic acids, such as glycolic acid, p-hydroxybenzoic acid and p-β-hydroxyethoxybexzoic acid, monofunctional components such as stearyl alcohol, heneicosanol, octacosanol, benzyl alcohol, stearic acid, behenic acid, benzoic acid, t-butylbenzoic acid and benzoylbenzoic acid, and trifunctional and higher polyfunctional components such as tricarballylic acid, trimellitic acid, trimesic acid, pyromellitic acid, naphthalene tetracarboxylic acid, gallic acid, trimethylolethane, trimethylolpropane, glycerol and pentaerythritol, may, for example, be used.

In the present invention, the dicarboxylic acid component containing terephthalic acid or its ester forming derivative as the main component, the diol component containing ethylene glycol as the main component and the copolymerizable component to be used as the case requires are usually mixed and prepared for the esterification reaction or the ester exchange reaction so that the lower limit of the molar ratio of the diol component to the dicarboxylic acid component is usually 1.02, preferably 1.03, and the upper limit is usually 2.0, preferably 1.7.

In the case of an ester exchange reaction, usually an ester exchange catalyst is required, and a large amount of such a catalyst is required. Accordingly, as the process for producing a polyester of the present invention, preferred is a production process via an esterification reaction.

The esterification reaction is carried out, for example, by means of a single esterification reaction tank or a multi-stage reaction apparatus having a plurality of esterification reaction tanks connected in series, under reflux of ethylene glycol, while removing water formed by the reaction and excess ethylene glycol out of the system, until the esterification ratio (the proportion of the esterified by a reaction with the diol component among the total carboxyl groups of the raw material dicarboxylic acid component) reaches usually at least 90%, preferably at least 93%. Further, the number average molecular weight of the polyester low molecular weight product as the esterification reaction product is preferably from 500 to 5,000.

As examples of the reaction conditions in the esterification reaction, in the case of a single esterification reaction tank, the temperature is usually at a level of from 200 to 280° C., the relative pressure to the atmospheric pressure is usually at a level of from 0 to 400 kPa (from 0 to 4 kg/cm$^2$G), and the reaction time is at a level of from 1 to 10 hours with stirring. In the case of a plurality of esterification reaction tanks, the lower limit of the reaction temperature in the esterification reaction tank for the first stage is usually 240° C., preferably 245° C., and the upper limit is usually 270° C., preferably 265° C.; the lower limit of the reaction pressure as the relative pressure to the atmospheric pressure is usually 5 kPa (0.05 kg/cm$^2$G), preferably 10 kPa (0.1 kg/cmG), and the upper limit is usually 300 kPa (3 kg/cm$^2$G), preferably 200 kPa (2 kg/cm$^2$G); the lower limit of the reaction temperature in the final stage is usually from 250° C., preferably 255° C., the upper limit is usually 280° C., preferably 275° C.; and the reaction pressure as the relative pressure to the atmospheric pressure is usually from 0 to 150 kPa (from 0 to 1.5 kg/cm$^2$G), preferably from 0 to 130 kPa (from 0 to 1.3 kg/cm$^2$G).

Further, in the esterification reaction, it is possible to suppress production of diethylene glycol as a by-product from ethylene glycol, by adding a small amount of e.g. a tertiary amine such as triethylamine, tri-n-butylamine or benzyl dimethylamine, a quaternary ammonium hydroxide such as tetraethylammonium hydroxide, tetra-n-butylammonium hydroxide or trimethylbenzylammonium hydroxide, or a basic compound such as lithium carbonate, sodium carbonate, potassium carbonate or sodium acetate.

As an example of the melt polycondensation, a method is common wherein the melt polycondensation is carried out under reduced pressure, while distilling off formed ethylene glycol out of the system, by means of a single melt polymerization tank, or a multi-stage reaction apparatus having a plurality of melt polycondensation tanks connected in series, for example, an apparatus comprising a perfect mixing type reactor equipped with stirring vanes for the first stage and horizontal plug flow type reactors equipped with stirring vanes for the second and third stages.

As examples of the reaction conditions in the melt polycondensation, in the case of a single polycondensation tank, the temperature is usually at a level of from 250 to 290° C., the pressure is gradually reduced from the atmospheric pressure, so that finally, the absolute pressure will be usually at a level of from 1.3 to 0.013 kPa (from 10 to 0.1 Torr), and the reaction time is at a level of from 1 to 20 hours with stirring. Whereas, as an example in the case of a plurality of polycondensation tanks, the lower limit of the reaction temperature in the polycondensation tank for the first stage is usually 250° C., preferably 260° C., and the upper limit is usually 290° C., preferably 280° C.; the upper limit of the reaction pressure as the absolute pressure is usually 65 kPa (500 Torr), preferably 26 kPa (200 Torr), and the lower limit is usually 1.3 kPa (10 Torr), preferably 2 kPa (15 Torr); the lower limit of the reaction temperature in the final stage is usually 265° C., preferably 270° C., and the upper limit is usually 300° C., preferably 295° C.; and the upper limit of the reaction pressure as the absolute pressure is usually 1.3 kPa (10 Torr), preferably 0.65 kPa (5 Torr), and the lower limit is usually 0.013 kPa (0.1 Torr), preferably 0.065 kPa (0.5 Torr). The reaction conditions for an intermediate stage are selected to be intermediate conditions thereof, for example, as an example of reaction conditions for the second stage in a three stage reaction apparatus, the lower limit of the reaction temperature is usually 265° C., preferably 270° C., and the upper limit is usually 295° C., preferably 285° C.; and the upper limit of the reaction pressure as the absolute pressure is usually 6.5 kPa (50 Torr), preferably 4 kPa (30 Torr), and the lower limit is usually 0.13 kPa (1 Torr), preferably 0.26 kPa (2 Torr).

The process for producing a polyester of the present invention comprises this polycondensation reaction in the presence of the above polymerization catalyst for a polyester preferably in the coexistence of a phosphorus compound. As the phosphorus compound to be used, specifically, a pentavalent phosphorus compound such as orthophosphoric acid, polyphosphoric acid, trimethyl phosphate, triethyl phosphate, tri-n-butyl phosphate, trioctyl phosphate, triphenyl phosphate, tricresyl phosphate, tris(triethylene glycol) phosphate, ethyl diethyl phosphonoacetate, methyl acid phosphate, ethyl acid phosphate, isopropyl acid phosphate, butyl acid phosphate, monobutyl phosphate, dibutyl phosphate, dioctyl phosphate or triethylene glycol acid phosphate, or a trivalent phosphorus compound such as phosphorous acid, hypophosphorous acid, diethyl phosphite, trisdodecyl phosphite, trisnonyldecyl phosphite or triphenyl phosphite, may, for example, be mentioned. Among them, orthophosphoric acid, tris(triethylene glycol) phosphate, ethyl diethyl phosphonoacetate, ethyl acid phosphate, triethylene glycol acid phosphate or phosphorous acid is preferred, tris(triethylene glycol) phosphate, ethyl diethyl phosphonoacetate, ethyl acid phosphate or triethylene glycol acid phosphate is more preferred, and ethyl acid phosphate is particularly preferred.

Addition of the polymerization catalyst for a polyester of the present invention to the reaction system may be carried out at any one of optional stages of a step of mixing the above dicarboxylic acid component and diol component, a preparation step and an esterification reaction step, and the initial stage of the melt polycondensation. However, the polymerization catalyst for a polyester of the present invention is added preferably at a stage where the esterification ratio reaches at least 90% so as to effectively obtain the effect of the present invention to produce a polyester excellent in color tone and transparency at a high reaction rate. As an example of a specific process, the polymerization catalyst is added preferably to an esterification reaction tank for the final stage in a multi-stage reaction apparatus or to the esterification reaction product in the stage of transportation from the esterification reaction tank to the melt polycondensation step. Particularly, the polymerization catalyst is added more preferably to the esterification reaction product in the stage of transportation from the esterification reaction tank to the melt polycondensation step.

Further, addition of the phosphorus compound to the reaction system is carried out preferably prior to addition of the polymerization catalyst for a polyester, whereby the melt polycondensability and the solid phase polycondensability, and the transparency and the color tone of a molded product formed from a polyester resin to be obtained, will be favorable.

Further, when the polymerization catalyst for a polyester of the present invention is added to the reaction system, it may be diluted with a solvent such as ethylene glycol depending upon the performance of the reaction equipment or the charge pump.

Further, in the process for producing a polyester of the present invention, for example, the amounts of the polymerization catalyst for a polyester and the phosphorus compound are preferably such that the total amount (T (mol/ton)) of atoms derived from the above metal element (1), the total amount (M (mol/ton)) of atoms derived from the above metal element (2) and the total amount (P (mol/ton)) of phosphorus atoms derived from the phosphorus compound satisfy the following formulae (I), (II) and (III):

$$0.002 \leq T \leq 1 \tag{I}$$

$$0.04 \leq M \leq 5 \tag{II}$$

$$0.02 \leq P \leq 4 \tag{III}$$

Further, in the present invention, the total amount (T (mol/ton)) of atoms derived from the above metal element (1) more preferably satisfies the following formula (I'), particularly preferably the following formula (I"). If the total amount of atoms derived from the above metal element (1) is less than the left-side value of the formulae, the polycondensability tends to decrease, and on the other hand, if it exceeds the right-side value of the following formula (I"), the color tone of a polyester tends to be yellowish, and the acetaldehyde content in a molded product tends to be high:

$$0.002 \leq T \leq 0.5 \tag{I'}$$

$$0.002 \leq T \leq 0.2 \tag{I"}$$

Further, in the present invention, the total amount (M (mol/ton)) of atoms derived from the above metal element (2) more preferably satisfies the following formula (II'). If the total amount of atoms derived from the above metal element (2) is less than the left-side value, the polycondensability tends to decrease, and if it exceeds the right-side value, the polycondensability, particularly the solid phase polycondensability as described hereinafter tends to decrease:

$$0.04 \leq M \leq 3 \tag{II'}$$

Further, in the present invention, the total amount (P (mol/ton)) of phosphorus atoms derived from the phosphorus compound more preferably satisfies the following formula (III'), particularly preferably the following formula (III"). If the total amount of phosphorus atoms derived from the above phosphorus compound is less than the left-side value of the formulae, the acetaldehyde content in a polyester tends to be high, and if it exceeds the right-side value of the formula (III"), the polycondensability, particularly the solid phase polycondensability as described hereinafter tends to decrease:

$$0.02 \leq P \leq 3 \quad (III')$$

$$0.02 \leq P \leq 2 \quad (III'')$$

Further, in the present invention, in a case where the above metal element (1) is titanium and the above metal element (2) is magnesium, the total amount (T1 (mol/ton)) of titanium atoms derived from titanium of the above (1), the total amount (M1 (mol/ton)) of magnesium atoms derived from magnesium of the above (2) and the total amount (P1 (mol/ton)) of phosphorus atoms derived from the phosphorus compound preferably satisfy the following formulae ($I_1$), ($II_1$) and ($III_1$):

$$0.020 \leq T1 \leq 0.200 \quad (I_1)$$

$$0.040 \leq M1 \leq 0.400 \quad (II_1)$$

$$0.020 \leq P1 \leq 0.300 \quad (III_1)$$

Further, the total amount (T1 (mol/ton)) of titanium atoms derived from titanium of the above (1) more preferably satisfies the following formula ($I_1'$), particularly preferably satisfies the following formula ($I_1''$). Further, the total amount (M1 (mol/ton)) of magnesium atoms derived from magnesium of the above (2) more preferably satisfies the following formula ($II_1'$), particularly preferably satisfies the following formula ($II_1''$). Further, the total amount (P1 (mol/ton)) of phosphorus atoms derived from the phosphorus compound more preferably satisfies the following formula ($III_1'$), particularly preferably satisfies the following formula ($III_1''$), especially preferably satisfies the following formula ($III_1'''$):

$$0.060 \leq T1 \leq 0.100 \quad (I_1')$$

$$0.070 \leq T1 \leq 0.090 \quad (I_1'')$$

$$0.060 \leq M1 \leq 0.300 \quad (II_1')$$

$$0.110 \leq M1 \leq 0.220 \quad (II_1'')$$

$$0.050 \leq P1 \leq 0.200 \quad (III_1')$$

$$0.080 \leq P1 \leq 0.180 \quad (III_1'')$$

$$0.090 \leq P1 \leq 0.150 \quad (III_1''')$$

Further, the proportion (M1/P1) of the total amount (M1 (mol/ton)) of magnesium atoms derived from magnesium of the above (2) to the total amount (P1 (mol/ton)) of phosphorus atoms derived from the above phosphorus compound preferably satisfies the following formula ($IV_1$), more preferably satisfies the following formula ($IV_1'$), particularly preferably satisfies the following formula ($IV_1''$). Further, the proportion (M1/T1) of the total amount (M1 (mol/ton)) of magnesium atoms derived from magnesium of the above (2) to the total amount (T1 (mol/ton)) of titanium atoms derived from titanium of the above (1) preferably satisfies the following formula ($V_1$), more preferably satisfies the following formula ($V_1'$), particularly preferably satisfies the following formula ($V_1''$), especially preferably satisfies the following formula ($V_1'''$). If (M1/P1) is less than the left-side value of the formula ($IV_1''$) and becomes smaller, the polycondensability as a polyester tends to decrease, and the color tone tends to be yellowish. On the other hand, if (M1/P1) exceeds the right-side value of the formula ($V_1''$) and becomes larger, the polycondensability, particularly the solid phase polycondensability as described hereinafter tends to decrease, and the color tone tends to decrease. Further, if (M1/T1) is less than the left-side value of the formula ($V_1'''$) and becomes smaller, the polycondensability as a polyester tends to decrease, and the color tone tends to be yellowish. On the other hand, if (M1/P1) exceeds the right-side value of the formula ($V_1'''$) and becomes large, the polycondensability, particularly the solid phase polycondensability as described hereinafter tends to decrease, and the color tone tends to decrease:

$$0.50 \leq M1/P1 \leq 3.00 \quad (IV_1)$$

$$0.90 < M1/P1 \leq 1.80 \quad (IV_1')$$

$$1.10 \leq M1/P1 \leq 1.50 \quad (IV_1'')$$

$$0.20 \leq M1/T1 \leq 4.00 \quad (V_1)$$

$$0.50 \leq M1/T1 \leq 3.50 \quad (V_1')$$

$$1.00 \leq M1/T1 \leq 2.90 \quad (V_1'')$$

$$1.50 \leq M1/T1 \leq 2.40 \quad (V_1''')$$

Further, the total amount (T1 (mol/ton)) of titanium atoms derived from titanium of the above (1), the total amount (M1 (mol/ton)) of magnesium atoms derived from magnesium of the above (2) and the total amount (P1 (mol/ton)) of phosphorus atoms derived from the phosphorus compound satisfy the above respective formulae, and besides, (P1/M1/T1) preferably satisfies the following formula ($IV_1$), more preferably satisfies the following formula ($IV_1'$), particularly preferably satisfies the following formula ($IV_1''$). If (P1/M1/T1) is less than the left-side value of the following formula ($VI_1''$) and becomes smaller, the color tone of a polyester tends to be yellowish, and if it exceeds the right-side value of the following formula ($VI_1''$) and becomes larger, the polycondensability, particularly the solid phase polycondensability as described hereinafter tends to decrease:

$$3.0 \leq P1/M1/T1 \leq 19.0 \quad (VI_1)$$

$$5.0 \leq P1/M1/T1 \leq 15.0 \quad (VI_1')$$

$$8.0 \leq P1/M1/T1 \leq 12.0 \quad (VI_1'')$$

In the process for producing a polyester of the present invention, the ratios represented by the above respective formulae based on the total amount of atoms derived from the above metal element (1), the total amount of atoms derived from the above metal element (2) and the total amount of phosphorus atoms derived from the phosphorus compound in the polymerization catalyst for a polyester of the present invention, are in most suitable ranges also in view of the diethylene glycol content, the acetaldehyde content in a polyester and in a molded product, and aroma-retention property.

The polyester to be obtained by the melt polycondensation has an intrinsic viscosity ([η1]) as a value measured at 30° C. in a mixed liquid of phenol/tetrachloroethane (weight ratio: 1/1) as a solvent, such that the lower limit is usually 0.35 dl/g, preferably 0.50 dl/g, and the upper limit is usually 0.75 dl/g, preferably 0.65 dl/g. If the intrinsic viscosity ([η1]) is less than the above range, the withdrawing property from the polycondensation tank as described hereinafter tends to be poor. On the other hand, if it exceeds the above range, it tends to be difficult to reduce the acetaldehyde content in the obtained polyester.

The polyester obtained by the melt polycondensation is usually withdrawn in the form of a strand from a discharge outlet provided at the bottom of the polycondensation tank and, while being cooled by water or after being cooled by water, cut by a cutter into particles such as pellets or chips. Further, such particles after the melt polycondensation are preferably subjected to solid phase polycondensation. The solid phase polycondensation is carried out, for example, by heating such particles in an atmosphere of an inert gas such as nitrogen, carbon dioxide or argon, under an elevated pressure of usually at most 100 kPa (1 kg/cm²G) preferably at most 20 kPa (0.2 kg/cm²G) as a relative pressure to the atmospheric pressure usually for a level of from 5 to 30 hours or under reduced pressure as an absolute pressure such that the upper limit is usually 6.5 kPa (50 Torr), preferably 1.3 kPa (10 Torr) and the lower limit is usually 0.013 kPa (0.1 Torr), preferably 0.065 kPa (0.5 Torr) usually for a level of from 1 to 20 hours at a lower limit temperature of usually 190° C., preferably 195° C. and an upper limit temperature of usually 230° C., preferably 225° C. By this solid phase polycondensation, it is possible to further increase the polymerization degree and to reduce the amount of by-products such as acetaldehyde.

Further, prior to the solid phase polycondensation, it is preferred to crystallize the surface of the polyester particles. As a method of crystallzing the surface of the polyester particles, for example, it is commonly carried out to heat the polyester particles in an atmosphere of an inert gas, in a steam atmosphere or in a steam-containing inert gas atmosphere at a lower limit temperature of usually 120° C., preferably 130° C. and an upper limit temperature of usually 200° C., preferably 190° C. for a level of from 1 minutes to 4 hours. Particularly, it is preferred to carry out the heating in a steam atmosphere so as to improve the crystallization rate of the polyester and to further reduce the acetaldehyde content in the obtained polyester.

The polyester obtained by the solid phase polycondensation has an intrinsic viscosity ([η2]) as a value measured at 30° C. in a mixed liquid of phenol/tetrachloroethane (weight ratio: 1/1) as a solvent such that the lower limit is usually 0.70 dl/g, preferably 0.73 dl/g, and the upper limit is usually 0.90 dl/g, preferably 0.85 dl/g. If the intrinsic viscosity ([η2]) is less than the above range, the mechanical strength as a molded product tends to decrease. On the other hand, if it exceeds the above range, it tends to be difficult to suppress formation of acetaldehyde or the like as by-products at the time of melt molding in some cases.

The polyester obtained by the above melt polycondensation or solid phase polycondensation may be subjected to the following treatment so as to inactivate the polymerization catalyst contained. As a treatment to inactivate the polymerization catalyst, water treatment of dipping it in warm water of at least 40° C. for at least 10 minutes, steam treatment of contacting it with steam or a steam-containing gas of at least 60° C. for at least 30 minutes, treatment with an organic solvent, treatment with an aqueous acidic solution or organic solution of e.g. various mineral acids, organic acids, phosphoric acid, phosphorous acid or a phosphate, or treatment with an alkaline aqueous solution or organic solution of e.g. a metal of Group 1A or 2A of the Periodic Table or an amine, may be commonly carried out.

The polyester produced by the production process of the present invention has a color coordinate value b of the Hunter's color difference formula in the Lab color system as disclosed in Reference 1 of JIS Z8730, of preferably at most 4.0, more preferably at most 3.0, particularly preferably at most 2.0, in order to suppress the yellowish color tone of a molded product. Further, it has a psychometric lightness value L of preferably at least 85, more preferably at least 88.

In order that the color coordinate value b will be within the above range, a so-called organic toning agent may be added. Such an organic toning agent may, for example, be a dye or pigment such as Solvent Blue 104, Solvent Red 135, Solvent Violet 36, Pigment Blue 29, 15:1 or 15:3, Pigment Red 187 or 263, or Pigment Violet 19. The addition amount is preferably at most 3.0 ppm, more preferably at most 2.0 ppm, particularly preferably at most 1.5 ppm, especially preferably at most 1.0 ppm, with a view to suppressing the decrease in the psychometric lightness value L. The timing of addition of the organic toning agent may be at any one of from the step of producing the polyester to the molding step, and is not particularly limited.

By addition of the organic toning agent, the color coordinate value b can be brought to at most 1.0 while maintaining the psychometric lightness value L of preferably at least 80, more preferably at least 83.

Further, the polyester produced by the production process of the present invention has a haze of preferably at most 5.0%, more preferably at most 3.0%, in the form of a molded plate having a thickness of 5 mm formed by injection molding at 280° C. Further, it has a haze of preferably at most 40%, more preferably at most 20%, particularly preferably at most 10%, in the form of a molded plate having a thickness of 5 mm formed by injection molding at 270° C.

The polyester produced by the production process of the present invention has an acetaldehyde content of preferably at most 3.0 ppm, more preferably at most 2.0 ppm, with a view to suppressing bad influences of molded products such as bottles over e.g. taste and flavor of a content. The acetaldehyde content in a molded product formed by injection molding at 280° C. is preferably at most 23 ppm, more preferably at most 20 ppm, particularly preferably at most 18 ppm, especially preferably at most 15 ppm.

Further, the polyester produced by the production process of the present invention has a cyclic trimer content of preferably at most 0.60 wt %, more preferably at most 0.50 wt %, particularly preferably at most 0.40 wt %, with a view to preventing a mold from being stained at the time of molding of e.g. bottles and imparting transparency to the molded products.

The polyester produced by the production process of the present invention may, for example, be molded into a preform by injection molding, followed by stretch blow molding, or molded into a parison by extrusion, followed by blow molding, to obtain a bottle or the like. Otherwise, it may be formed into a sheet by extrusion, followed by heat forming to obtain a tray, a container or the like, or said sheet may be biaxially stretched to obtain a film or the like, which will be particularly useful for packaging materials for food and beverage products. Among them, it is particularly suitable for molding the preform obtained by injection molding into a bottle by a blow molding method by biaxial stretching, and it is suitable, for example, for a container for e.g. a carbonated beverage, an alcoholic beverage, or a liquid seasoning such as soy sauce, a regular sauce, Japanese sweet rice wine for cooking or dressing, or after heat setting, for a container for a beverage such as a fruit juice beverage, a vitamin beverage, a flavor tea or mineral water.

EXAMPLES

Now, the present invention will be described in further detail with reference to Examples. However, the present invention is by no means restricted to the following Examples within a range not to exceed the gist.

Example 1

Preparation of Polymerization Catalyst for a Polyester

A mixed liquid comprising 41 parts by weight of ethylene glycol and 4 parts by weight of water was put in a preparation tank equipped with a stirrer under normal pressure at room temperature, 1.5 parts by weight of magnesium acetate tetrahydrate was added to the mixed liquid, stirred and dissolved, and further, 3.8 parts by weight of a 98 wt % aqueous solution of lactic acid (0.777 mol/kg of lactic acid par 1 kg of catalyst) was added, stirred and mixed, and then 2.4 parts by weight of tetra-n-butyl titanate was added, followed by stirring for 30 minutes for dissolution, thereby to prepare a polymerization catalyst A-3 for a polyester. This catalyst A-3 contained 6,200 ppm (0.129 mol/kg) of titanium atoms and 3,100 ppm (0.128 mol/kg) of magnesium atoms, and had a pH of 4 and a turbidity of 5% in a light path length of 10 mm as measured by the following methods. The composition and analyzed values of the catalyst are shown in Table 1.

pH of Catalyst

Using an automatic titration system "Model AUT-501" manufactured by DKK TOA CORPORATION, a pH electrode was immersed in a liquid catalyst in the air atmosphere, and a measured value was read.

Turbidity of Catalyst

Using a haze meter "NDH-300A" manufactured by NIPPON DENSHOKU INDUSTRIES CO., LTD., a liquid catalyst was put in a cell with a light path length of 10 mm, and the total light transmittance (Tt (%)) and the diffuse transmittance (Td (%)) were measured at 23° C. under 50% RH using ethylene glycol as a control, and the turbidity was calculated from the following formula:

(Td/Tt)×100(%)

Production of Polyester

To an esterification reaction tank having 60 parts by weight of an ethylene terephthalate oligomer having an average polymerization degree of 6 preliminarily charged therein and maintained at a temperature of 250° C. under a pressure of $1.2 \times 10^5$ Pa, a slurry comprising 43 parts by weight of terephthalic acid and 19 parts by weight of ethylene glycol was supplied over a period of 4 hours to carry out an esterification reaction, and after completion of the supply, the esterification reaction was carried out further for 1 hour, and then 60 parts by weight of the obtained esterification reaction product was transported to a polycondensation tank.

Then, to the polycondensation tank to which the esterification reaction product was transported, through a pipe thereof, ethyl acid phosphate in the form of an ethylene glycol solution was added in such an amount that the total amount P as phosphorus atoms per 1 ton of a polyester to be obtained would be 0.210 mol/ton, and five minutes later, 0.048 part by weight of the above obtained catalyst A-3 (such an amount that the total amount M as magnesium atoms would be 0.103 mol/ton and the total amount P as titanium atoms would be 0.104 mol/ton per 1 ton of a polyester to be obtained). Then, while the temperature in the system was increased from 250° C. to 280° C. over a period of two and a half hours and the pressure was reduced from normal pressure to $4 \times 10^2$ Pa over a period of 1 hour and the pressure was maintained, melt polycondensation was carried out until the intrinsic viscosity [η1] of the obtained polyester became 0.60 dl/g. Then, the product was withdrawn in the form of a strand from a discharge outlet provided at the bottom of the polycondensation tank, cooled with water and then cut into chips, whereby melt polycondensed polyester chips were produced.

Then, the above obtained melt polycondensed polyester chips were continuously supplied for crystallization to an agitation crystallizer maintained at about 160° C. so that the retention time would be about 5 minutes, and then dried in an inert oven "Model IPHH-201" manufactured by ESPEC Corp. in a stream of nitrogen at 40 L/min at 160° C. for 2 hours, and then heated at 210° C. for a period so that the intrinsic viscosity ([η2]) of the obtained polyester become 0.75 dl/g for solid phase polycondensation. The intrinsic viscosity ([η1]) of the melt polycondensed polyester and the intrinsic viscosity ([η2]) of the solid phase polycondensed polyester were measured by the following method, and the melt polycondensation velocity (V1) and the solid phase polycondensation velocity (V2) were calculated from the obtained values in accordance with the following formula, and the results are shown in Table 2.

Intrinsic Viscosity [η1], [η2]

0.50 g of a freeze-pulverized polyester sample was dissolved at a concentration (c) of 1.0 g/dl in a mixed liquid of phenol/tetrachloroethane (weight ratio: 1/1). A melt polycondensed polyester was dissolved at 110° C., and a solid phase polycondensed polyester was dissolved at 120° C., each over a period of 30 minutes. Then, by means of an Ubbellohde capillary viscometer, the relative viscosity (ηrel) to the solvent was measured at 30° C., and a ratio (ηsp/c) of the specific viscosity (ηsp) obtained from this relative viscosity (ηrel)−1, to the concentration (c), was obtained. In a similar manner, the corresponding ratios (ηsp/c) were obtained when the concentration (c) was 0.5 g/dl, 0.2 g/dl and 0.1 g/dl, respectively. From these values, a ratio (ηsp/c) when the concentration (c) was extrapolated to be 0, was obtained as each of the intrinsic viscosities [η1] and [η2].

Melt Polycondensation Velocity (V1) and Solid Phase Polycondensation Velocity (V2)

Melt polycondensation velocity(V1)=[η1]/melt polycondensation time(Tm)

Solid phase polycondensation velocity(V2)=([η2]−[η1])/solid phase polycondensation time(Ts)

Further, with respect to the obtained solid phase polycondensed polyester chips, the metal element contents derived from the catalyst or the like, the color coordinated value b and the haze of a molded plate were measured by the following methods, and the results are shown in Table 2.

Contents of Metal Atoms 2.5 g of a polyester sample was ashed and completely decomposed by hydrogen peroxide in the presence of sulfuric acid in accordance with a usual method and then adjusted by distilled water to a constant volume of 50 ml, and with respect to this sample, quantitative analysis was carried out by means of a plasma emission spectrometer "ICP-AES JY46P model", manufactured by JOBIN YVON COMPANY, whereupon the total amount T (mol/ton) as titanium atoms, the total amount M (mol/ton) as magnesium atoms and the total amount P (mol/ton) of phosphorus atoms per 1 ton of the polyester were calculated.

Color Tone

A polyester sample was filled into a cylindrical powder colorimetric cell having an inner diameter of 30 mm and a depth of 12 mm, and by means of a colorimetric color difference meter "ND-300A", manufactured by NIPPON DENSHOKU INDUSTRIES CO., LTD., the color coordinate value b of the Hunter's color difference formula in the Lab color system as disclosed in Reference 1 of JIS Z8730, was obtained as a simple average value of values measured at four positions by rotating the cell every 90° by a reflection method.

Haze of Molded Plate

Figure 1:
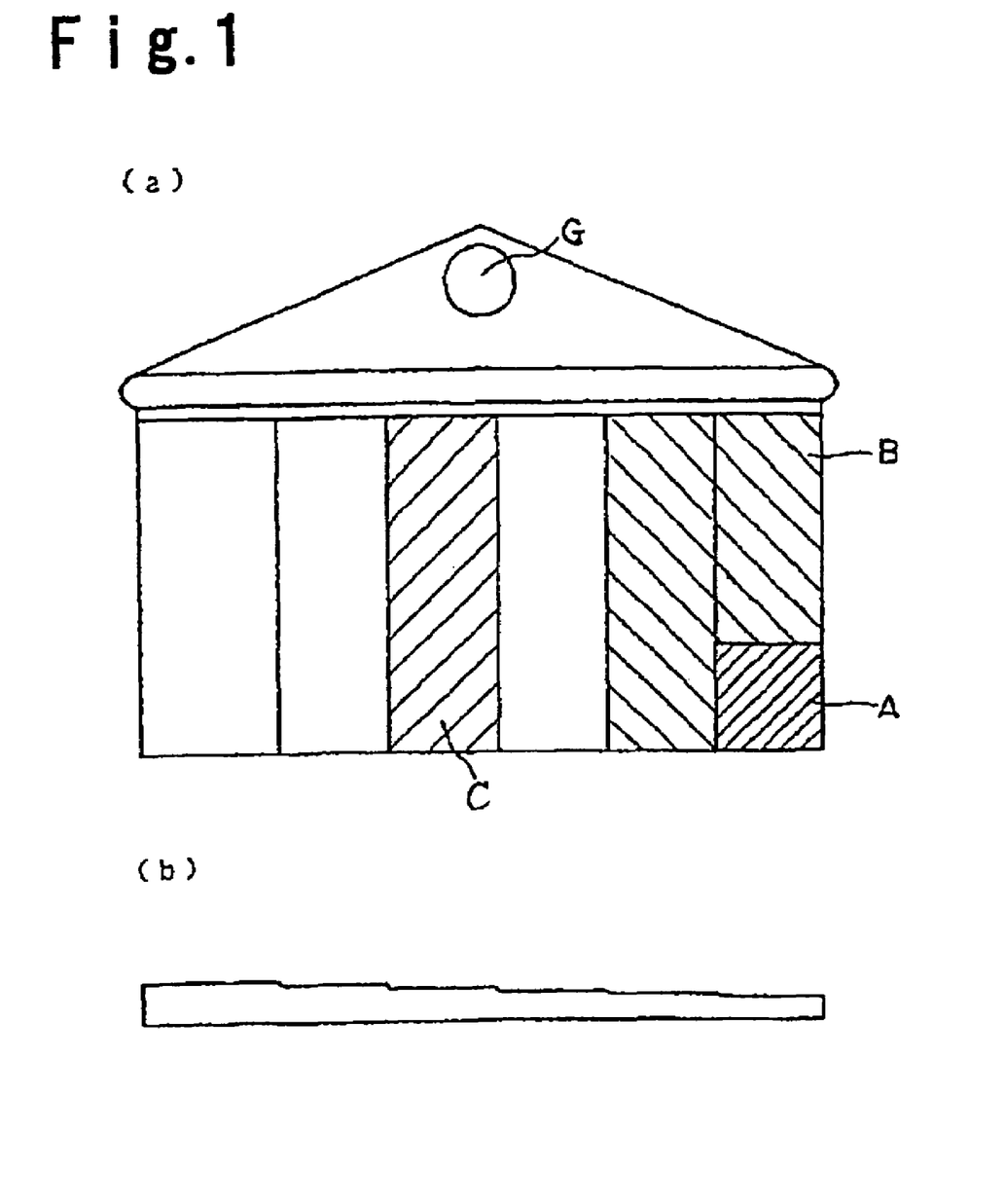

The polyester chips were dried at 160° C. for 4 hours in a nitrogen stream of 40 L/min in an inert oven "IPHH-201 model", manufactured by ESPEC Corp., and then, by an injection molding machine "M-70AII-DM", manufactured by Meiki Co., Ltd., a stepped molded plate having a shape as shown in FIG. 1 and having a size of 50 mm×100 mm and thicknesses of six stages ranging from 6 mm to 3.5 mm in a transverse direction with each step being 0.5 mm, was injection-molded at a cylinder temperature of 280° C. under a back pressure of $5 \times 10^5$ Pa at an injection rate of 40 cc/sec under a dwell pressure of $35 \times 10^5$ Pa at a mold temperature of 25° C. with a molding cycle of about 75 seconds. In FIG. 1, G indicates a gate portion. With respect to the portion having a thickness of 5.0 mm (portion C in FIG. 1) in the obtained molded plate, the haze was measured by means of a haze meter "NDH-300A", manufactured by NIPPON DENSHOKU INDUSTRIES CO., LTD.

Comparative Example 1-1

Example in Accordance with Example 60F JP-A-2002-179781

Production of Polyester

Melt polycondensation was carried out in the same manner as in Example 1 except that into the polycondensation tank to which the esterification reaction product was transported, through a pipe thereof, instead of the catalyst A-3, tetra-n-butyl titanate in the form of a 0.5 wt % ethylene glycol solution was added in such an amount that the total amount T as titanium atoms would be 0.104 mol/ton, 5 minutes later, magnesium acetate tetrahydrate in the form of a 0.6 wt % ethylene glycol solution was added in such an amount that the total amount M as magnesium atoms per 1 ton of the obtained polyester would be 0.103 mol/ton, and 5 minutes later, ethyl acid phosphate in the form of an ethylene glycol solution was further added in such an amount that the total amount P as phosphorus atoms per 1 ton of the obtained polyester would be 0.210 mol/ton. Then, solid phase polycondensation was carried out to produce a polyester, and evaluations were carried out in the same manner. The results are shown in Table 2.

In Comparative Example 1-1, the polycondensation catalysts were added dividedly as compared with Example 1. Resultingly, the polycondensation velocity was low, and the obtained polyester had impaired color tone and transparency.

Comparative Example 1-2

Production of Polyester

Melt polycondensation was carried out in the same manner as in Example 1 except that into the polycondensation tank to which the esterification reaction product was transported, through a pipe thereof, ethyl acid phosphate in the form of an ethylene glycol solution was added in such an amount that the total amount P as phosphorus atoms per 1 ton of the obtained polyester would be 0.210 mol/ton, and five minutes later, instead of the catalyst A-3, a mixture of a 0.6 wt % ethylene glycol solution of magnesium acetate tetrahydrate and a 0.5 wt % ethylene glycol solution of tetra-n-butyl titanate (when they were mixed, white precipitates were formed, and the mixture had a turbidity of 55% in a light path length of 10 mm) was added in such an amount that the total amount M as magnesium atoms would be 0.103 mol/ton and the total amount T of titanium atoms would be 0.104 mol/ton per 1 ton of the obtained polyester. Then, solid phase polycondensation was carried out to produce a polyester, and evaluations were carried out in the same manner. The result are shown in Table 2.

A polycondensation catalyst having an increased turbidity was added in Comparative Example 1-2 as compared with Example 1. Resultingly, the polycondensation velocity was low, and the obtained polyester had impaired color tone and transparency.

Comparative Example 1-3

Example in Accordance with Example 20F JP-A-2001-64377

Preparation of Polymerization Catalyst for a Polyester 500 ml of deionized water was put in a 1,000 ml glass beaker, 0.15 g of anhydrous magnesium hydroxide was added, followed by stirring for dissolution, and then the dispersion was cooled in an ice bath, and 5 g of titanium tetrachloride was dropped with stirring. When the liquid became acidic, magnesium hydroxide was dissolved and formation of hydrogen chloride was terminated, the liquid was taken out from the ice bath, and a 25% aqueous ammonia was dropped with stirring until the pH of the liquid became 8, to form precipitates of a titanium-containing composite hydroxide. The formed precipitates of the titanium-containing composite hydroxide were separated from the supernatant liquid by centrifugal segmentation at 2,500 revolutions for 15 minutes, washed with deionized water five times, and then subjected to centrifugal segmentation at 2,500 revolutions for 15 minutes for solid-liquid separation, and the obtained solid was dried under reduced pressure at 70° C. under 10 Torr for 18 hours to produce a solid titanium-containing compound as a polymerization catalyst B for a polyester. The obtained solid titanium-containing compound had a molar ratio of titanium atoms:magnesium atoms of 91:9 and a molar ratio of titanium atoms:hydroxyl groups of 1:0.3.

Production of Polyester

Melt polycondensation was carried out in the same manner as in Example 1 except that into the polycondensation tank to which the esterification reaction product was transported, no ethylene glycol solution of ethyl acid phosphate was added, and that through a pipe, instead of the catalyst A-3, the above obtained catalyst B in the form of a 1 wt % slurry having pulverized products of the catalyst at a level of 10 μm dispersed in ethylene glycol (the slurry had a turbidity of 50% in a light path length of 10 mm) was added in such an amount that the total amount T as titanium atoms per 1 ton of the obtained polyester would be 0.251 mol/ton. Then, solid phase polycondensation was carried out to produce a polyester, and evaluations were carried out in the same manner. The results are shown in Table 2. At the time of addition of the ethylene glycol slurry of the catalyst B through the pipe, an increase and a change in pressure occurred, which are considered to be due to scaling in the pipe, and stable addition over a long period was difficult.

In Comparative Example 1-3, a polycondensation catalyst having a low m/t ratio was added in the form of a solid, as compared with Example 1. Resultingly, the polycondensation velocity was low, and the obtained polyester had impaired color tone and transparency.

Comparative Example 1-4

Preparation of Polymerization Catalyst for a Polyester in Accordance with Reference Example 110F JP-A-2003-82084

500 ml of deionized water was weighed in a 1,000 ml glass beaker, and 0.15 g of anhydrous magnesium hydroxide was added and dispersed. After the liquid was cooled in an ice bath, 5 g of titanium tetrachloride was dropped with stirring. The liquid became acidic along with dropping, and the dispersed magnesium hydroxide was dissolved. When formation of hydrogen chloride was terminated, the liquid was taken out from the ice bath, and a 25% aqueous ammonia was dropped with stirring at room temperature to bring the pH of the liquid 9. Then, a 15% aqueous acetic acid solution was dropped with stirring at room temperature to bring the pH of the liquid 5. Formed precipitates of a titanium-containing composite hydroxide were separated by filtration. The precipitates were washed with deionized water 5 times. The precipitates after washing were immersed in a 20 wt % ethylene glycol-containing water for 30 minutes, and the solid-liquid separation was carried out by filtration in the same manner as washing. The titanium-containing composite hydroxide after washing was dried under reduced pressure at 40° C. under 1.3 kPa (10 Torr) for 20 hours to remove moisture, thereby to obtain a solid titanium-containing compound. The obtained solid titanium-containing compound was pulverized into particles at a level of from 10 to 20 µm before it was dissolved in ethylene glycol.

In the solid titanium-containing compound, as measured by ICP analysis, the metal titanium content was 33 wt % and the metal magnesium content was 3 wt %. Then, 100 g of ethylene glycol was weighed in a 200 ml glass flask, and 0.5 g of p-toluenesulfonic acid was added, and then 0.36 g of the above solid titanium-containing compound was added and heated at 150° C. for 1 hour for dissolution, to produce a polycondensation catalyst D for a polyester.

The solution had a titanium content of 0.12 wt % as measured by ICP analysis, and the solution had a turbidity of 5% in a light path length of 10 mm as measured by the above method.

Production of Polyester

Melt polycondensation was carried out in the same manner as in Example 1 except that into the polycondensation tank to which the esterification reaction product was transferred, through a pipe thereof, instead of the catalyst A-3, the catalyst D was added in such an amount that the total amount T as titanium atoms per 1 ton of the obtained polyester would be 0.104 mol/ton. Then, solid phase polycondensation was carried out to produce a polyester, and evaluations were carried out in the same manner. The results are shown in Table 2.

In Comparative Example 1-4, a polycondensation catalyst having a low m/t ratio was added in the form of a solution as compared with Example 1. Resultingly, the polycondensation velocity was low, and the obtained polyester had impaired color tone and transparency.

Example 2-1

Preparation of Polymerization Catalyst for a Polyester

A polymerization catalyst A-1 for a polyester was produced in the same manner as in Example 1 except that the amount of magnesium acetate tetrahydrate was 3.0 parts by weight. The catalyst A-1 contained 6,200 ppm (0.129 mol/kg) of titanium atoms and 6,200 ppm (0.255 mol/kg) of magnesium atoms, had a pH of 4, and had a turbidity of 5% in a light path length of 10 mm.

The composition and analyzed values of the catalyst are shown in Table 1.

Production of Polyester

Using a continuous polymerization apparatus comprising a slurry preparation tank, esterification reaction tanks of two stages connected in series thereto and melt polycondensation tanks of three stages connected in series to the second stage esterification reaction tank, terephthalic acid and ethylene glycol were continuously supplied in amount of 865 parts by weight and 485 parts by weight respectively, to the slurry preparation tank, and a 0.3 wt % ethylene glycol solution of ethyl acid phosphate was continuously added in an amount of 6.0 parts by weight per hour, followed by stirring and mixing to prepare a slurry. This slurry was continuously transported to the first stage esterification reaction tank set for an average retention time of 4 hours in a nitrogen atmosphere at 260° C. under a relative pressure of 50 kPa (0.5 kg/cm$^2$G) and then to the second stage esterification reaction tank set for an average retention time of 1.5 hours in a nitrogen atmosphere at 260° C. under a relative pressure of 5 kPa (0.05 kg/cm$^2$G), to carry out an esterification reaction. At that time, the esterification ratio as measured by the following method, was 85% in the first stage and 95% in the second stage.

Esterification Ratio

A sample was pulverized in a mortar, 1.0 g thereof was accurately weighed in a beaker, 40 ml of dimethylformamide was added thereto, followed by heating at 180° C. for 20 minutes with stirring for dissolution, and then the wall of the beaker was washed with 10 ml of dimethylformamide of 180° C., followed by cooling to room temperature. This solution was titrated with a 0.1N KOH methanol solution by means of a Potentiograph "Model E-536" automatic titration apparatus manufactured by Metrohm using a composite pH electrode "EA-120". From the titer (A (ml)) obtained from the inflection point of a titration curve thus prepared, the factor (f1) of the 0.1N KOH methanol solution prepared and standardized by the method as disclosed in JIS K8006 and the weight (W (g)) of the sample, the amount (AV (meg/g)) of free terminal carboxyl groups was obtained from the following formula:

$$AV(meg/g) = \{A \times f1 \times (1/10)\}/W$$

Then, 0.3 g of the sample pulverized in a mortar was accurately weighed in an Erlenmeyer flask, 20 ml of a 0.5N KOH ethanol solution was added by a transfer pipette, 10 ml of pure water was further added, a reflux condenser was set, and the sample was hydrolyzed by reflux under heating for 2 hours with sometimes stirring on a plate heater having the surface temperature set at 200° C. After the sample was left to cool, it was titrated with a 0.5N hydrochloric acid aqueous solution using phenolphthalein as an indicator. The 0.5N KOH ethanol solution and the 0.5N hydrochloric acid aqueous solution were prepared and standardized by the method as disclosed in JIS K8006. Further, as the phenolphthalein, one prepared in such a manner that 1 g of phenolphthalein was dissolved in 90 ml of methanol and adjusted by distilled water to a constant volume of 100 ml, was used. Further, titration was carried out under the same conditions with no sample as a blank. From the titer (Vs (ml)) of the sample, the titer (Vb (ml)) of the blank, the factor (f2) of the 0.5N hydrochloric acid aqueous solution and the weight (W (g)) of the sample, the amount (SV (meg/g)) of carboxyl groups derived from the total carboxylic acids was obtained from the following formula:

$$SV(meg/g) = \{(Vb - Vs) \times f2 \times (1/2)\}/W$$

Then, from the obtained AV (meq/g) and SV (meq/g), the esterification ratio (%) was obtained from the following formula:

Esterification ratio (%)={(SV−AV)/SV}×100

Then, at the time of transporting the esterification reaction product obtained as described above to the melt polycondensation tank, the catalyst A-1 obtained as described above was continuously added in an amount of 0.65 part by weight per hour to the esterification reaction product in the transportation pipe, and the esterification reaction product was continuously transported to the first stage melt polycondensation tank set at 270° C. under an absolute pressure of 2.6 kPa (20 Torr), then to the second stage melt polycondensation tank set at 278° C. under an absolute pressure of 0.5 kPa (4 Torr) and then to the third stage melt polycondensation tank set at 280° C. under an absolute pressure of 0.3 kPa (2 Torr), to carry out melt polycondensation by adjusting the total retention time so that the intrinsic viscosity ($[\eta_1]$) of the obtained polyester would be 0.60 dl/g, whereupon the product was continuously withdrawn in the form of a strand from a discharge outlet provided at the bottom of the polycondensation tank, cooled with water and then cut into chips to produce melt polycondensed polyester chips.

Then, the polyester chips obtained as obtained above were continuously supplied for crystallization to an agitation crystallizer held at about 160° C. in a nitrogen atmosphere so that the retention time would be about 60 minutes and then continuously supplied to a tower type solid phase polycondensation apparatus and subjected to solid phase polycondensation in a nitrogen atmosphere at 210° C. by adjusting the retention time so that the intrinsic viscosity ($[\eta_2]$) of the obtained polyester would be 0.83 dl/g. With respect to the obtained solid phase polycondensed polyester, evaluations were carried out in the same manner as in Example 1, and the results are shown in Table 3.

Examples 2-2 TO 2-6

Preparation of Polymerization Catalyst for a Polyester

In the same manner as in preparation of the polymerization catalyst A-1 for a polyester of Example 2-1 except that the addition amount of magnesium acetate tetrahydrate was changed, polymerization catalysts A-2 and A-4 to A-6 for a polyester were prepared. The composition and the analyzed values of the catalysts are shown in Table 1.

Production of Polyester

In the same manner as in Example 2-1 except that the catalysts A-2 to A-6, instead of the catalyst A-1, were added in such amounts that the total amount T as titanium atoms are 1 ton of the obtained polyester would be as shown in Table 3, melt polycondensation was carried out, and solid phase polycondensation was carried out to produce polyesters, and evaluations were carried out in the same manner. The results are shown in Table 3.

Comparative Example 2-1

Production of Polyester

In the same manner as in Example 2-1 except that instead of the catalyst A-1, magnesium acetate tetrahydrate in the form of an ethylene glycol solution was added to the second stage esterification reaction tank, and tetra-n-butyl titanate in the form of an ethylene glycol solution was added to the esterification reaction product in the transportation pipe from the second stage esterification reaction tank to the first stage melt polycondensation tank, melt polycondensation was carried out, and then solid phase polycondensation was carried out to produce a polyester, and evaluations were carried out in the same manner. The results are shown in Table 3.

In Comparative Example 2-1, polycondensation catalysts were added dividedly as compared with Examples 2-1 to 2-6. Resultingly, the polycondensation velocity was low, and the obtained polyester had impaired color tone and transparency.

Comparative Example 2-2

Example wherein Catalyst Composition Liquid in Example 1 of JP-A-7-207010 was used Preparation of Polymerization Catalyst for a Polyester 50 g of ethylene glycol was charge into a glass container, 0.37 g of tetra-n-butyl titanate was mixed at a temperature of 20° C., and 0.5 g (58 mol % to the titanium catalyst) of a 5 wt % sodium hydroxide aqueous solution was added, followed by uniform stirring to prepare a uniform catalyst composition liquid. The catalyst composition liquid will be referred to as a polymerization catalyst C for a polyester.

Production of Polyester

In the same manner as in Example 2-1 except that 0.231 part by weight (in such an amount that the total amount as sodium atoms would be 0.049 mol/ton and the total amount T as titanium atoms would be 0.084 mol/ton per 1 ton of the obtained polyester) of the catalyst C was added instead of the catalyst A-1, melt polycondensation was carried out, and then solid phase polycondensation was carried out to produce a polyester, and evaluations were carried out in the same manner. The results are shown in Table 3.

In Comparative Example 2-2, sodium which is a metal element of Group 1A of the Periodic Table was employed instead of magnesium which is a metal element of the Group 2A of the Periodic Table in the polycondensation catalyst as compared with Examples 2-1 to 2-6. Resultingly, the polycondensation velocity was low, and the obtained polyester had and impaired color tone.

Comparative Example 2-3

Example wherein Na and Ti in the Same Ratio as in the Catalyst Composition Liquid of comparative Example 2-2 were Separately Added Production of Polyester In the same manner as in Comparative Example 2-2 except that instead of the catalyst D, a 5 wt % sodium hydroxide aqueous solution was added to the second stage esterification reaction tank in such an amount that the total amount as sodium atoms per 1 ton of obtained polyester would be 0.049 mol/ton, and tetra-n-butyl titanate in the form of an ethylene glycol solution was added to the esterification reaction product in the transportation pipe from the second stage esterification reaction tank to the first stage melt polymerization tank in such an amount that the total amount T as titanium atoms per 1 ton of the obtained polyester would be 0.084 mol/ton, melt polycondensation was carried out, and then solid phase polycondensation was carried out to produce a polyester, and evaluations were carried out in the same manner. The results are shown in Table 3.

In Comparative Example 2-3, sodium which is a metal element of Group 1A of the Periodic Table was employed instead of magnesium which is a metal element of Group 2A of the Periodic Table in the polycondensation catalyst, and the catalysts were dividedly added, as compared with Examples 2-1 to 2-6. Resultingly, the polycondensation velocity was low, and the obtained polyester had an impaired color tone.

Comparative Examples 2-4 and 2-5

Preparation of Polymerization Catalyst for a Polyester

The same operation as in Preparation of the polymerization catalyst A-1 for a polyester of Example 2-1 was carried out except that the addition amount of magnesium acetate terahydrate was changed, to prepare polymerization catalysts A-7 and A-8 for a polyester. Various analyzed values of the catalysts are shown in Table 1.

Production of Polyester

In the same manner as in Example 2-1 except that the catalysts A-7 and A-8 were added instead of the catalyst A-1 in such amounts that the total amount T as titanium atoms per 1 ton of the obtained polyester would be as shown in Table 3, melt polycondensation was carried out, and then solid phase polycondensation was carried out to produce polyesters, and evaluations were carried out in the same manner. The results are shown Table 3.

In Comparative Example 2-4, a polycondensation catalyst having a low m/t ratio was added, and in Comparative Example 2-5, a polycondensation catalyst having a high m/t ratio was added, as compared with Examples 2-1 to 2-6. Resultingly, the polycondensation velocity was low, and the obtained polyester had an impaired color tone.

Example 2-7

Preparation of Polymerization Catalyst for a Polyester

The same operation as in preparation of the polymerization catalyst A-1 for a polyester of Example 2-1 was carried out except that no water was added, to produce a polymerization catalyst A-9 for a polyester. The composition and analyzed values of this catalyst are shown in Table 1.

Production of Polyester

In the same manner as in Example 2-1 except that the catalyst A-9 was added instead of the catalyst A-1, melt polycondensation was carried out, and then solid phase polycondensation was carried out to produce a polyester, and evaluations were carried out in the same manner. The results are shown in Table 3.

Example 2-8

Polymerization Catalyst for a Polyester

The polymerization catalyst A-9 for a polyester obtained in Example 2-7 was stored at 70° C. for one week. The turbidity of this catalyst (hereinafter referred to as "A-9'") was measured in accordance with the above method and found to be 16%.

Production of Polyester

In the same manner as in Example 2-7 except that the catalyst A-9' was added instead of the catalyst A-9, melt polycondensation was carried out, and then solid phase polycondensation was carried out to produce a polyester, and evaluations were carried out in the same manner. The results are shown in Table 3.

Comparative Example 2-6

Preparation of Polymerization Catalyst for a Polyester

The same operation as in preparation of the polymerization catalyst A-1 for a polyester of Example 2-1 was carried out except that the addition amount of water was changed, to produce a polymerization catalyst for a polyester, whereupon a polymerization catalyst A-10 for a polyester having an impaired turbidity was obtained. The composition and analyzed values of this catalyst are shown in Table 1.

Production of Polyester

In the same manner as in Example 2-1 except that the catalyst A-10 was added instead of the catalyst A-1, melt polycondensation was carried out, and then solid phase polycondensation was carried out to produce a polyester, and evaluations were carried out in the same manner. The results are shown in Table 3.

At the time of addition of the catalyst A-10 from the pipe, an increase and a change in pressure occurred, which are considered to be due to scaling in the pipe, and stable addition for a long period was difficult.

In Comparative Example 2-7, a polycondensation catalyst having an impaired turbidity was used as compared with Example 2-1. Resultingly, the polycondensation velocity was low, and the obtained polyester had impaired color tone and transparency.

Example 3

Production of Polyester

In the same manner as in Example 2-1 except that the catalyst A-1 obtained in Example 2-1 was continuously added to the second stage esterification reaction tank, melt polycondensation was carried out, and then solid phase polycondensation was carried out to produce a polyester, and evaluations were carried out in the same manner. The results are shown in Table 3.

TABLE 1

| | EG amount | TBT addition amount | Titanium | | MGA addition amount | Magnesium | | Water addition amount | |
| | | | Titanium atom concentration | | | Magnesium atom concentration | | | |
| Catalyst | (parts by weight) | (parts by weight) | (ppm) | (mol/kg) | (parts by weight) | (ppm) | (mol/kg) | (parts by weight) | (%) |
| --- | --- | --- | --- | --- | --- | --- | --- | --- | --- |
| A-1 | 41 | 2.4 | 6,200 | 0.129 | 3.0 | 6,200 | 0.255 | 4 | 7 |
| A-2 | 41 | 2.4 | 6,500 | 0.135 | 0.9 | 2,000 | 0.081 | 4 | 8 |
| A-3 | 41 | 2.4 | 6,200 | 0.129 | 1.5 | 3,100 | 0.128 | 4 | 8 |
| A-4 | 41 | 2.4 | 6,400 | 0.133 | 1.9 | 4,100 | 0.167 | 4 | 8 |
| A-5 | 41 | 2.4 | 6,100 | 0.128 | 4.0 | 8,200 | 0.338 | 4 | 7 |
| A-6 | 41 | 2.4 | 6,000 | 0.126 | 4.8 | 9,700 | 0.400 | 4 | 7 |
| A-7 | 41 | 2.4 | 6,600 | 0.137 | 0.3 | 700 | 0.027 | 4 | 8 |

TABLE 1-continued

| A-8 | 41 | 2.4 | 5,900 | 0.123 | 6.1 | 12,100 | 0.496 | 4 | 7 |
| --- | --- | --- | --- | --- | --- | --- | --- | --- | --- |
| A-9 | 41 | 2.4 | 6,700 | 0.140 | 3.0 | 6,700 | 0.279 | 0 | 0 |
| A-10 | 41 | 2.4 | 4,200 | 0.088 | 3.0 | 4,200 | 0.174 | 30 | 37 |

| Catalyst | Lactic acid addition amount (parts by weight) | (mol/kg) | m/t (mol/mol) | A/m (mol/mol) | pH | Turbidity (%) | High temperature stability test |
| --- | --- | --- | --- | --- | --- | --- | --- |
| A-1 | 3.8 | 0.778 | 1.96 | 3.0 | 4 | 5 | ○ |
| A-2 | 3.8 | 0.810 | 0.60 | 9.6 | 3 | 4 | ○ |
| A-3 | 3.8 | 0.777 | 0.99 | 6.1 | 4 | 5 | ○ |
| A-4 | 3.8 | 0.794 | 1.25 | 4.7 | 4 | 5 | ○ |
| A-5 | 3.8 | 0.764 | 2.65 | 2.3 | 4 | 4 | ○ |
| A-6 | 3.8 | 0.753 | 3.20 | 1.9 | 6 | 6 | Δ |
| A-7 | 3.8 | 0.819 | 0.19 | 28.8 | 3 | 5 | ○ |
| A-8 | 3.8 | 0.736 | 4.00 | 1.6 | 8 | 7 | X |
| A-9 | 3.8 | 0.840 | 1.96 | 3.0 | 7 | 8 | Δ |
| A-10 | 3.8 | 0.526 | 1.96 | 3.0 | 4 | 48 | — |

TBT: tetra-n-butyl titanate
MGA: magnesium acetate tetrahydrate

TABLE 2

| | | Ex. 1 | Comp. Ex. 1-1 | Comp. Ex. 1-2 | Comp. Ex. 1-3 | Comp. Ex. 1-4 |
| --- | --- | --- | --- | --- | --- | --- |
| Polymerization method | | Esterification method:batch method | | | | |
| Polycondensation catalyst and the like | | | | | | |
| Catalyst species | Catalyst A to D | A-3 | | | B | D |
| | Others | | ○(Divided) | ○(Mixed) | | |
| Total amount of atoms per 1 ton of the obtained polyester | (1) Metal atoms (T) (mol/t) | 0.104 | 0.104 | 0.104 | 0.251 | 0.104 |
| | (2) Metal atoms (M) (mol/t) | 0.103 | 0.103 | 0.103 | 0.029 | 0.020 |
| | Phosphorus atoms (P) (mol/t) | 0.210 | 0.210 | 0.210 | 0 | 0.210 |
| | M/P (mol/mol) | 0.49 | 0.49 | 0.49 | — | 0.09 |
| | M/T (mol/mol) | 0.99 | 0.99 | 0.99 | 0.12 | 0.19 |
| | P/M/T (mol/mol/mol) | 19.6 | 19.6 | 19.6 | 0 | 102 |
| Melt polycondensation | | | | | | |
| Intrinsic viscosity | [η1] (dl/g) | 0.60 | 0.60 | 0.60 | 0.60 | 0.60 |
| Polymerization time | (hr) | 4.0 | 4.5 | 5.0 | 4.4 | 6.6 |
| Polycondensation velocity | [V1] (dl/g/hr) | 0.150 | 0.133 | 0.120 | 0.136 | 0.091 |
| Solid phase polycondensation | | | | | | |
| Intrinsic viscosity | [η2] (dl/g) | 0.75 | 0.75 | 0.75 | 0.75 | 0.75 |
| Polycondensation time | (hr) | 7.5 | 11.5 | 13.6 | 12.5 | 32.5 |
| Polycondensation velocity | [V2] (dl/g/hr) | 0.020 | 0.013 | 0.011 | 0.012 | 0.005 |
| Physical properties of polyester | | | | | | |
| Color coordinate b | | 2.8 | 4.7 | 5.5 | 10.6 | 12.3 |
| Haze of molded plate | (%) | 3.7 | 26 | 35 | 37 | 24 |

TABLE 3

| | | Ex. 2-1 | Ex. 2-2 | Ex. 2-3 | Ex. 2-4 | Ex. 2-5 | Ex. 2-6 | Comp. Ex. 2-1 |
| --- | --- | --- | --- | --- | --- | --- | --- | --- |
| Polymerization method | | Esterification method:continuous method | | | | | | |
| Polycondensation catalyst and the like | | | | | | | | |
| Catalyst species | Catalyst A to D | A-1 | A-2 | A-3 | A-4 | A-5 | A-6 | |
| | Others | | | | | | | ○ (Divided) |
| Total amount of atoms per 1 ton of the obtained polyester | (1) Metal atoms (T) (mol/t) | 0.084 | 0.084 | 0.084 | 0.084 | 0.084 | 0.084 | 0.084 |
| | (2) Metal atoms (M) (mol/t) | 0.165 | 0.050 | 0.083 | 0.105 | 0.223 | 0.269 | 0.165 |

TABLE 3-continued

|  |  |  |  |  |  |  |  |  |
|---|---|---|---|---|---|---|---|---|
|  | Phosphorus atoms (P) (mol/t) | 0.129 | 0.129 | 0.129 | 0.129 | 0.129 | 0.129 | 0.129 |
|  | M/P (mol/mol) | 1.28 | 0.39 | 0.64 | 0.81 | 1.73 | 2.08 | 1.28 |
|  | M/T (mol/mol) | 1.96 | 0.60 | 0.99 | 1.25 | 2.65 | 3.20 | 1.96 |
|  | P/M/T (mol/mol/mol) | 9.31 | 30.5 | 18.5 | 14.6 | 6.9 | 5.7 | 9.31 |
| Melt polycondensation |  |  |  |  |  |  |  |  |
| Intrinsic viscosity | [η1] (dl/g) | 0.60 | 0.60 | 0.60 | 0.60 | 0.60 | 0.60 | 0.60 |
| Polymerization time | (hr) | 3.1 | 3.3 | 3.2 | 3.1 | 3.1 | 3.2 | 3.5 |
| Polycondensation velocity | [V1] (dl/g/hr) | 0.194 | 0.182 | 0.188 | 0.194 | 0.194 | 0.188 | 0.171 |
| Solid phase polycondensation |  |  |  |  |  |  |  |  |
| Intrinsic viscosity | [η2] (dl/g) | 0.83 | 0.83 | 0.83 | 0.83 | 0.83 | 0.83 | 0.83 |
| Polycondensation time | (hr) | 7.9 | 9.9 | 8.9 | 8.4 | 8.4 | 8.9 | 10.5 |
| Polycondensation velocity | [V2] (dl/g/hr) | 0.029 | 0.023 | 0.026 | 0.027 | 0.027 | 0.026 | 0.022 |
| Physical properties of polyester |  |  |  |  |  |  |  |  |
| Color coordinate b |  | 1.6 | 1.9 | 1.8 | 1.7 | 1.7 | 2.1 | 3.2 |
| Haze of molded plate | (%) | 1.2 | — | — | — | — | — | 1.8 |

|  |  | Comp. Ex. 2-2 | Comp. Ex. 2-3 | Comp. Ex. 2-4 | Comp. Ex. 2-5 | Ex. 3 |
|---|---|---|---|---|---|---|
| Polymerization method |  | Esterification method:continuous method | | | | |
| Polycondensation catalyst and the like |  |  |  |  |  |  |
| Catalyst species | Catalyst A to D | C |  | A-7 | A-8 | A-1 |
|  | Others |  | ○ (Divided) |  |  |  |
| Total amount of atoms per 1 ton of the obtained polyester | (1) Metal atoms (T) (mol/t) | 0.084 | 0.084 | 0.084 | 0.084 | 0.084 |
|  | (2) Metal atoms (M) (mol/t) | 0 | 0 | 0.016 | 0.336 | 0.165 |
|  | Phosphorus atoms (P) (mol/t) | 0.129 | 0.129 | 0.129 | 0.129 | 0.129 |
|  | M/P (mol/mol) | 0 | 0 | 0.12 | 2.60 | 1.28 |
|  | M/T (mol/mol) | 0 | 0 | 0.19 | 4.00 | 1.96 |
|  | P/M/T (mol/mol/mol) | — | — | 96 | 4.6 | 9.31 |
| Melt polycondensation |  |  |  |  |  |  |
| Intrinsic viscosity | [η1] (dl/g) | 0.60 | 0.60 | 0.60 | 0.60 | 0.60 |
| Polymerization time | (hr) | 4.1 | 4.1 | 3.5 | 3.5 | 3.2 |
| Polycondensation velocity | [V1] (dl/g/hr) | 0.146 | 0.146 | 0.171 | 0.171 | 0.188 |
| Solid phase polycondensation |  |  |  |  |  |  |
| Intrinsic viscosity | [η2] (dl/g) | 0.83 | 0.83 | 0.83 | 0.83 | 0.83 |
| Polycondensation time | (hr) | 12.0 | 12.0 | 12.0 | 10.5 | 8.8 |
| Polycondensation velocity | [V2] (dl/g/hr) | 0.019 | 0.019 | 0.019 | 0.022 | 0.026 |
| Physical properties of polyester |  |  |  |  |  |  |
| Color coordinate b |  | 3.7 | 3.6 | 3.1 | 3.3 | 1.9 |
| Haze of molded plate | (%) | — | — | — | — | 1.3 |

Example 4

Production of Polyester

Into an esterification reaction tank, 100 parts by weight of dimethyl terephthalate and 70 parts by weigh of ethylene glycol were charged and melted in a nitrogen atmosphere at 150° C., and then calcium acetate monohydrate and magnesium acetate tetrahydrate as ester exchange catalysts were added in such amount that the remaining amount as calcium atoms would be 68 ppm and the remaining amount as magnesium atoms would be 47 ppm based on the obtained polyester. Then, the temperature was increased to 240° C. over the period of 3 hours, and ester exchange reaction was carried out while methanol and excess ethylene glycol were distilled off under normal pressure, and then trimethyl phosphate was added in such an amount that the remaining amount as phosphorus atoms would be 30 ppm based on the obtained polyester, and the ester exchange reaction was substantially completed.

Then, the obtained ester exchange reaction product was transported to a polydondensation tank, and the catalyst A-1 obtained in Example 2-1 was added in such an amount that the remaining amount as titanium atoms would be 3 ppm and the remaining amount as magnesium atoms would be 3 ppm based on the obtained polyester, and at the same time, Solvent Blue 104 ("Polysynthrene Blue RBL" manufactured by Clariant K.K.) and Solvent Red 135 ("Sandplast Red G" manufactured by Clariant K.K.) as organic toning agents were added each in such an amount that the remaining amount would be 1.50 ppm based on the obtained polyester. Then, the temperature was increased to 280° C. over a period of 45 minutes and at the same time, the pressure was reduced from normal pressure to 0.3 kPa (2 Torr) over a period of 1 hour, and melt polycondensation was carried out until the intrinsic viscosity [η1] of the obtained polyester became 0.60 dl/g, and then the obtained product was withdrawn in the form of a strand from a discharge outlet provided at the bottom of the polycondensation tank, cooled with water and then cut into chips, to produce melt polycondensation polyester chips. With respect to the obtained melt polycondensation polyester, evaluations were carried out in the same manner as in Example 1, and the results are shown in Table 4.

Comparative Example 4

Production of Polyester

In the same manner as in Example 4 except that to the ester exchange reaction product, instead of the catalyst A-1, tetra-n-butyl titanate was added in such an amount that the remaining amount as titanium atoms would be 3 ppm based on the obtained polyester, melt polycondensation was carried out to produce a polyester, and evaluations were carried out in the same manner. The results are shown in Table 4.

In Comparative Example 4, a polycondensation catalyst containing no magnesium which is a metal element of Group 2A of the Periodic Table was added, as compared with Example 4. Resultingly, the polycondensation velocity was low, and the obtained polyester had an impaired color tone.

TABLE 4

| | | Ex. 4 | Comp. Ex. 4 |
|---|---|---|---|
| Polymerization method | | Esterification method: batch method | |
| Polycondensation catalyst and the like | | | |
| Catalyst species | Catalyst A to D | A-1 | |
| | Others | | ○ (Ti alone) |
| Melt polycondensation | | | |
| Intrinsic viscosity | [η1] (dl/g) | 0.60 | 0.60 |
| Polymerization time | (hr) | 2.8 | 3.5 |
| Polymerization velocity | [V1] (dl/g/hr) | 0.210 | 0.170 |
| Physical properties of polyester | | | |
| Color coordinate b | | 0.4 | 2.5 |
| Haze of molded plate | (%) | — | — |

High Temperature Stability Test

Stability under storage at a high temperature of each of the catalysts used in the above Examples and Comparative Examples was tested in accordance with the following procedure, and the results are shown in Table 1.

Each of the catalysts used in the above Examples and Comparative Example was stored at 70° C. for one week, and then the turbidity of the catalyst was measured in accordance with the above method, and an evaluation was made based on standards ○: turbidity of at most 10%, Δ: turbidity higher than 10% and at most 20%, ×: turbidity higher than 20%.

INDUSTRIAL APPLICABILITY

According to the present invention, a polymerization catalyst for a polyester with which a polyester excellent in color tone, transparency, etc. can be produced at a high reaction velocity, a method for producing it and a process for producing a polyester using it can be provided.

The present application is based on a Japanese Patent Application No. 2003-061248 (filed on Mar. 7, 2003), and the entire disclosure thereof is hereby included by reference.

What is claimed is:

1. A polymerization catalyst for the preparation of a polyester, comprising:
    combined catalyst components comprising at least metal elements (1) and (2);
    wherein:
    metal element (1) is at least one metal element selected from the group consisting of metal elements of Group 4B of the Periodic Table;
    metal element (2) is at least one metal element selected from the group consisting of metal elements of Group 2A of the Periodic Table, aluminum, manganese, iron, cobalt, zinc, gallium and germanium;
    when a total amount of metal atoms derived from metal element (1) is represented by t (mol/catalyst kg), and a total amount of metal atoms derived from metal element (2) is represented by m (mol/catalyst kg), a value of m/t is given by: $0.50 < m/t < 3.50$;
    the catalyst is a liquid; and
    the liquid exhibits a turbidity of at most 20% in a light path length of 10 mm.

2. The polymerization catalyst for a polyester according to claim 1, which has a pH of at most 7.

3. The polymerization catalyst for a polyester according to claim 1, which further comprises the following component (3):
    (3) an organic solvent and/or water.

4. The polymerization catalyst for a polyester according to claim 3, wherein component (3) is an organic solvent and water.

5. The polymerization catalyst for a polyester according to claim 3, wherein the organic solvent for component (3) is an alcohol.

6. The polymerization catalyst for a polyester according to claim 1, which further contains component (4) which is at least one acid selected from the group consisting of organic acids and inorganic acids.

7. The polymerization catalyst for a polyester according to claim 6, wherein the acid of component (4) is an organic acid.

8. The polymerization catalyst for a polyester according to claim 7, wherein the organic acid of component (4) is an aliphatic carboxylic acid.

9. The polymerization catalyst for a polyester according to claim 1, wherein metal element (1) is titanium.

10. The polymerization catalyst for a polyester according to claim 1, wherein metal element (2) is at least one member selected from the group consisting of metal elements of Group 2A of the Periodic Table, iron and zinc.

11. The polymerization catalyst for a polyester according to claim 10, wherein metal element (2) is magnesium.

12. A method for producing the polymerization catalyst for a polyester as defined in claim 1, which comprises:
    stirring a compound of metal element (1), a compound of metal element (2), and components (3) and (4) identified below at a temperature ranging from 0 to 200° C. for at least 5 minutes:
    (3) an organic solvent and/or water,
    (4) at least one acid selected from the group consisting of organic acids and inorganic acids.

13. The method for producing the polymerization catalyst for a polyester according to claim 12, wherein the compound containing metal element (1) is at least one compound selected from the group consisting of tetra-n-propyl titanate, tetra-i-propyl titanate, tetra-n-butyl titanate, tetra-n-butyl titanate tetramer, tetra-t-butyl titanate, acetyl-tri-i-propyl titanate, titanium acetate, titanium oxalate and titanium chloride.

14. A polymerization catalyst for a polyester obtained by the method as defined in claim 12.

15. A process for producing a polyester, comprising:

conducting an esterification reaction and a polycondensation reaction of a dicarboxylic acid component comprising terephthalic acid as the main component and a diol component comprising ethylene glycol as the main component in the presence of the polymerization catalyst for a polyester as defined in claim 1.

* * * * *